(12) United States Patent
Carboni et al.

(10) Patent No.: US 10,364,781 B2
(45) Date of Patent: Jul. 30, 2019

(54) QUICK FIT CONNECTOR

(71) Applicant: GM GLOBAL TECHNOLOGY OPERATIONS LLC, Detroit, MI (US)

(72) Inventors: Daniele Carboni, Turin (IT); Riccardo Rossi, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 301 days.

(21) Appl. No.: 15/235,799

(22) Filed: Aug. 12, 2016

(65) Prior Publication Data

US 2017/0045024 A1 Feb. 16, 2017

(30) Foreign Application Priority Data

Aug. 13, 2015 (GB) .................................. 1514389.4

(51) Int. Cl.
*F16L 37/00* (2006.01)
*F02M 55/00* (2006.01)
*F02M 61/14* (2006.01)

(52) U.S. Cl.
CPC ........ *F02M 55/002* (2013.01); *F02M 55/004* (2013.01); *F02M 55/005* (2013.01); *F02M 61/14* (2013.01); *F16L 37/008* (2013.01); F02M 2200/8023 (2013.01)

(58) Field of Classification Search
CPC ..... F16L 37/008; F16L 37/08; F16L 37/0842; F16L 37/086; F02M 55/002
USPC ......... 285/81, 82, 87, 88, 319, 257; 123/469
See application file for complete search history.

(56) References Cited

U.S. PATENT DOCUMENTS

| 3,724,882 | A | * | 4/1973 | Dehar | .................... | F16L 37/05 |
| | | | | | | 285/243 |
| 4,635,973 | A | * | 1/1987 | Sauer | ..................... | F16L 33/22 |
| | | | | | | 285/242 |
| 2010/0244302 | A1 | | 9/2010 | Okuno et al. | | |
| 2011/0089683 | A1 | * | 4/2011 | Maunder | ............... | F16L 33/225 |
| | | | | | | 285/257 |
| 2012/0153612 | A1 | * | 6/2012 | Thomson | .............. | F16L 37/098 |
| | | | | | | 285/81 |
| 2012/0168018 | A1 | * | 7/2012 | Knis | .................... | F02M 55/002 |
| | | | | | | 138/89 |

(Continued)

FOREIGN PATENT DOCUMENTS

| EP | 1394402 A2 | 3/2004 |
| WO | 2005059426 A1 | 6/2005 |

OTHER PUBLICATIONS

Great Britain Patent Office, Great Britain Search Report for Great Britain Application No. 1514389.4, dated Feb. 15, 2016.

*Primary Examiner* — Aaron M Dunwoody
(74) *Attorney, Agent, or Firm* — Lorenz & Kopf, LLP (57) ABSTRACT

A quick fit connector is disclosed for the return line of fuel injectors in an internal combustion engine. The connector includes a T- or L-shaped connector body having at least one connection branch insertable in a fuel return port of a fuel injector, a lower plate, an upper plate and a spring clip. The upper plate is slidingly mounted on the spring clip and the connector body and is movable between an unlocked position, in which the spring clip is in unloaded condition and free from any engagement with the fuel injector, and a locked position in which the spring clip is in loaded condition and engages the fuel injector and the lower plate.

18 Claims, 12 Drawing Sheets

(56) References Cited

U.S. PATENT DOCUMENTS

| | | | |
|---|---|---|---|
| 2013/0249209 A1* | 9/2013 | Netzer | F16L 25/009 285/81 |
| 2014/0021714 A1* | 1/2014 | Ueda | A61M 39/1011 285/81 |
| 2015/0176739 A1* | 6/2015 | Dude | F16L 37/0982 285/82 |
| 2016/0018035 A1 | 1/2016 | Seong et al. | |

* cited by examiner

QUICK FIT CONNECTOR

CROSS-REFERENCE TO RELATED APPLICATION

This application claims priority to British Patent Application No. 1514389.4, filed Aug. 13, 2015, which is incorporated herein by reference in its entirety.

TECHNICAL FIELD

The present disclosure pertains to a connector for low pressure hydraulic circuits and, in particular, a quick fit connector for connecting the injector backflow port to a fuel return line.

BACKGROUND

Internal combustion engines are provided with injectors, as for example electro-actuated solenoid injectors that guarantee a high number of pulses at high fuel pressure thanks to a combination of electrical and hydraulic actuation. This kind of injectors is basically made by a high pressure hydraulic valve and a low pressure electro-actuated valve to change hydraulic condition of the first one. Therefore such injectors requires a low pressure circuit to discharge the fuel used for the valves actuation in a fuel return line in order to collect backflow fuel coining out from injectors.

Different solutions have been proposed in the prior art to connect the backflow port of the injectors to the low pressure return line. For example, banjo fittings (also known as banjo bolts or banjo screws) are largely used in the automotive field for providing pipe connections in high pressure circuits. This is a cost and time expensive solution and requires suitable tools to fix the fitting on the devices connected to the pipe system.

A simpler and cheaper solution envisages a straight connector to be introduced in the backflow port of an injector and a retaining metal clip for latching the connector to the injector. However, this solution does not guarantee error proofing during assembly and service operations.

SUMMARY

In accordance with the present disclosure, a connector is provided that can be easily and rapidly installed in an internal combustion engine to connect the backflow port of the injectors of an internal combustion engine to the low pressure fuel return line. The connector can reduce the risk of an improper mounting connection between the injector and the fuel return line. Also in accordance with the present disclosure, a connector is provided that can be firmly mounted on an injector in order to prevent accidental disconnection and undesired fuel leakages, and can be also easily and rapidly removed from the injector to simplify service and maintenance operations.

According to an embodiment, a quick fit connector for the return line of fuel injectors in an internal combustion engine includes a T- or L-shaped connector body having at least one connection branch insertable in a fuel return port of an injector; a lower plate; an upper plate; and a spring clip. The upper plate is slidingly mounted on the spring clip and the connector body, and the upper plate is movable between an unlocked position, in which the spring clip is in unloaded condition and free from any engagement with the injector, and a locked position in which the spring clip is in loaded condition and engages the injector and the lower plate. Once the connection branch of the T- or L-shaped connector body has been introduced into the fuel return port of an injector, the installation of the connector simply requires pushing down the upper plate to compress and load the spring clip up to the engagement with the injector.

According to an embodiment, the connector body has at least two through passages parallel to the at least one connection branch, and a coupling retainer for the lower plate are provided inside said through passages. The lower plate has at least two arms projecting perpendicularly from the plate to slidingly engage the through passages of the connector body and has a central hole in which the at least one connection branch is slidingly engaged. The coupling retainers are advantageously provided at the end of the arms to cooperate with the coupling retainers provided inside the through passages of the connector body. Moreover, the lower plate has at least two flanges projecting outside from the perimeter of the plate. The flanges have advantageously multiple functions, e.g. to retain in its lower position the lower plate with respect to the connector body and the spring clip before the installation of the connector and to provide a useful mechanism to ensure the correct latching of the spring clip on the injector.

Indeed, the spring clip has a web-shaped body including at least two wing portions extending from a central portion. Inwardly protruding lips are provided at the end of the wing portions. The wing portions are angled outwardly when the spring clip is in unloaded condition and brought toward one another when the spring clip is in loaded condition. The inwardly protruding lips engage the injector when the spring clip is in loaded condition.

The flanges of the lower plate abut against the wing portions when the spring clip is in unloaded condition and the wing portions of the spring clip include openings where the flanges of the lower plate are received in engagement when the spring clip is in loaded condition. In other words, as mentioned above, the lower plate is retained in its lower position with its flanges abutting the wing portions of the spring clip and, at the same time, the lower plate at its lower position prevent the spring clip to be compressed if the connection branch of the connector is not completely inserted in the injector port. After inserting the connection branch in the injector port, the lower plate is pushed up at an upper position, in which the flanges of the lower plate engage the openings in the wing portions, thus allowing the spring clip to be freely compressed.

At least one error proofing mark is advantageously provided on the external surface of the wing portions of the spring clip. The error proofing mark is concealed by the upper plate in its unlocked position and becomes visible when the upper plate is in its locked position. In other words, when the spring clip is completely compressed, the upper plate has reached its lower position and the observable mark guarantees the correct installation of the connector.

The coupling retainers are also provided on the external surface of the wing portions of the spring clip for retaining the upper plate on the same. Indeed, the upper plate includes a central hole engaged on the connector body and on the spring clip, and The coupling retainers are provided inside the central hole to cooperate with the coupling retainers provided on the external surface of the wing portions of the spring clip. In this way, the upper plate cannot move up once at its lower position, i.e. the locked position.

According to an embodiment, The coupling retainers for the upper plate are also provided on the external surface of the connector body. In turn, the upper plate includes a central hole engaged on the connector body and on the spring clip, and The coupling retainers are provided inside the central hole to cooperate with the coupling retainers provided on the external surface of the connector body. This allows the upper plate to be retained at its upper position before the installation.

According to the above embodiments, a good error proofing chain is obtained, e.g. by the mark which is visible only when the upper plate reaches its lower position; this position can be reached only when the spring clip is completely compressed; spring clip can be compressed only when the lower plate is at its upper position; and the lower plate can reach its upper position only when the connection branch of the connector is completely inserted in the injector port.

Also the removal of the connector can be simply carried out by applying a radial force on both the wing portions of the spring clip in order to free the upper plate from the coupling retainers of the spring clip and to move the upper plate up to the unlocked position Moreover, thanks to several The coupling retainers of the above embodiments, the components of the connector are jointly maintained as a single item which is ready to be installed without using tools or the like.

According to another aspect of the disclosure, a method for mounting a quick fit connector to an injector in an internal combustion engine. A quick fit connector is provided having a T- or L-shaped connector body including at least one connection branch, a lower plate, an upper plate and a spring clip, wherein the upper plate is slidingly mounted on the spring clip and the connector body. The at least one connection branch of the T- or L-shaped connector body is inserted in a fuel return port of an injector. The upper plate is pushed down from an unlocked position, in which the spring clip is in unloaded condition and free from any engagement with the injector, up to a locked position in which the spring clip is in loaded condition and engages the injector and the lower plate.

According to an embodiment of the method, the spring clip has a web-shaped body including a central portion extending between at least two wing portions and protruding inwardly lips are provided at the end of said wing portions. The wing portions are angled outwardly and flanges projecting outside from the perimeter of the lower plate abut against the wing portions when the upper plate is in the unlocked position and said spring clip is in unloaded condition. The wing portions of the spring clip also include openings where the flanges of the lower plate are received in engagement when the upper plate is in the locked position and the spring clip is in loaded condition. In this condition, the inwardly protruding lips at the end of the wing portions engage the injector when the upper plate is pushed down up to the locked position.

According to an embodiment of the method, the spring clip has a web-shaped body including a central portion extending between at least two wing portions. At least one error proofing mark is provided on the external surface of the wing portions of the spring clip. The at least one error proofing mark is concealed by the upper plate in its unlocked position and becomes visible when the upper plate reaches the locked position.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
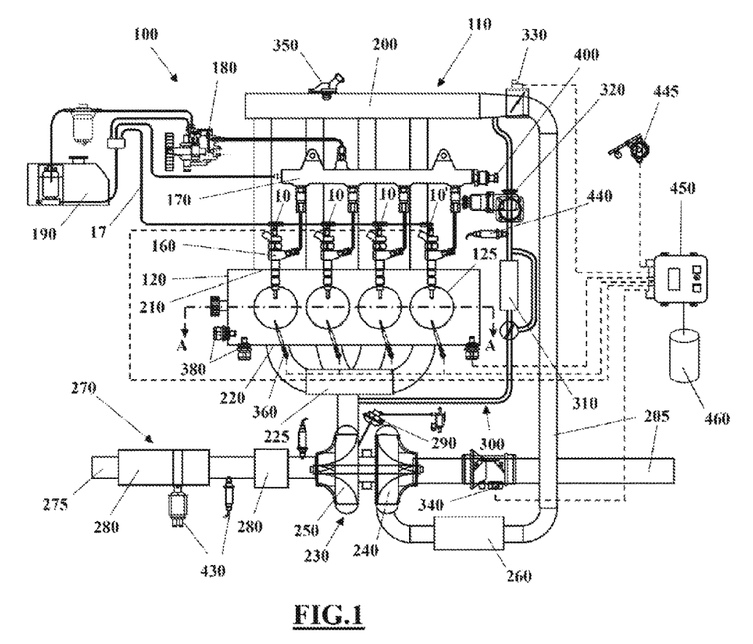
FIG. 1 shows a possible embodiment of an automotive system including an internal combustion engine.
Figure 2:
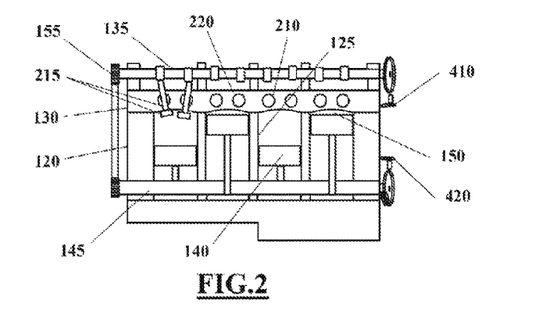
FIG. 2 is a cross-section according to the plane A-A of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190. Also a low pressure fuel return line 17 connects the injectors 160 to the fuel source 190 through T-shaped connectors 10 and one L-shaped connector 10'.

Each of the cylinders 125 has at least two valves 215, actuated by the camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust system 270 may include an exhaust pipe 275 having one or more exhaust aftertreatment devices 280. The aftertreatment devices may be any device configured to change the composition of the exhaust gases. Some examples of aftertreatment devices 280 include, but are not limited to, catalytic converters (two and three way), oxidation catalysts, lean NOx traps, hydrocarbon adsorbers, selective catalytic reduction (SCR) systems, and particulate filters. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system 460, or data carrier, and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices.

Instead of an ECU 450, the automotive system 100 may have a different type of processor to provide the electronic logic, e.g. an embedded controller, an onboard computer, or any processing module that might be deployed in the vehicle.

Figure 3:
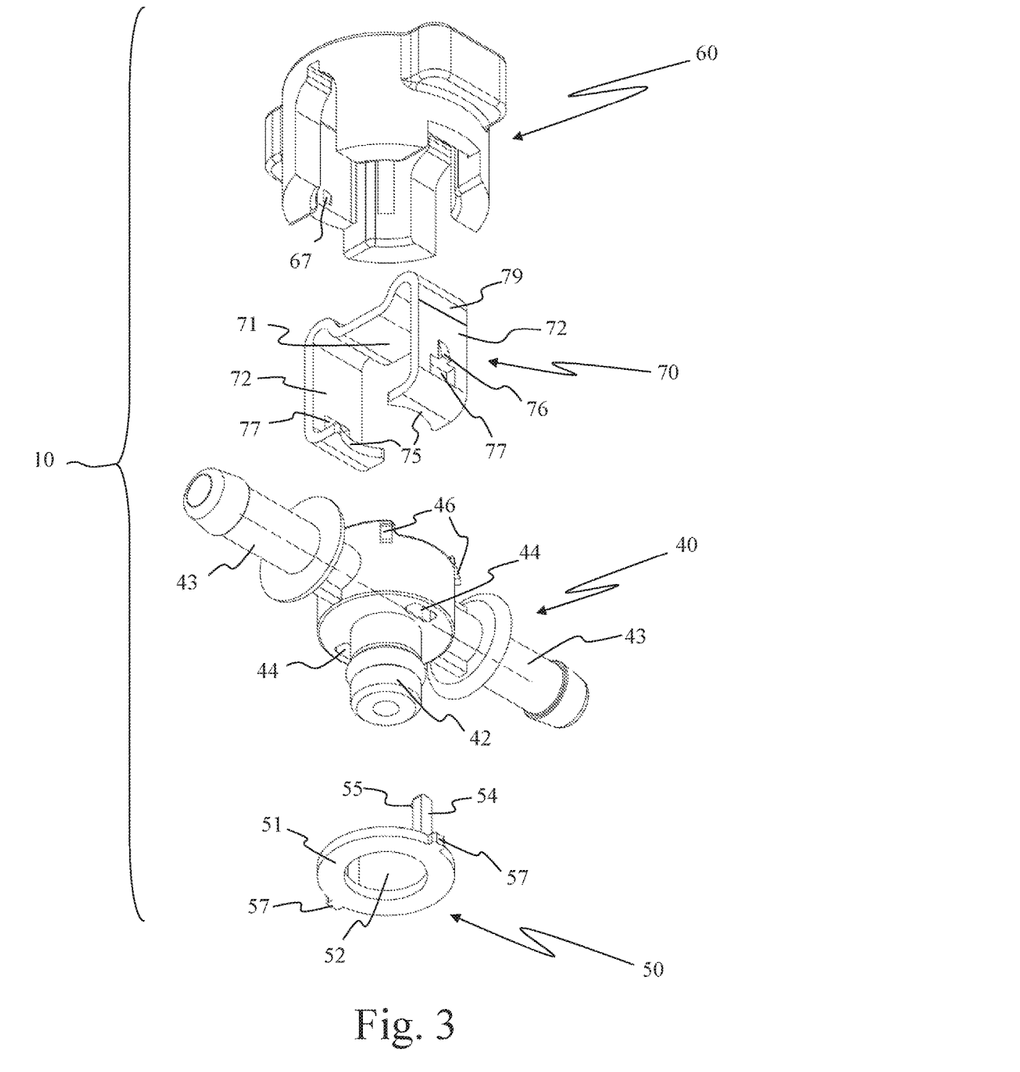
FIG. 3 is an exploded isometric view of some components of an embodiment of a quick fit connector.

As better shown in FIG. 3, an embodiment of a T-shaped connector 10 for the return line 17 of fuel injectors 160 in an internal combustion engine 110 includes a T-shaped connector body 40 having a connection branch 42 insertable in a fuel return port 15 (see e.g. FIGS. 9A and 9B) of an injector 160, a lower plate 50, an upper plate 60 and a spring clip 70.

Figures 4A, 4B, 4C, 4D:
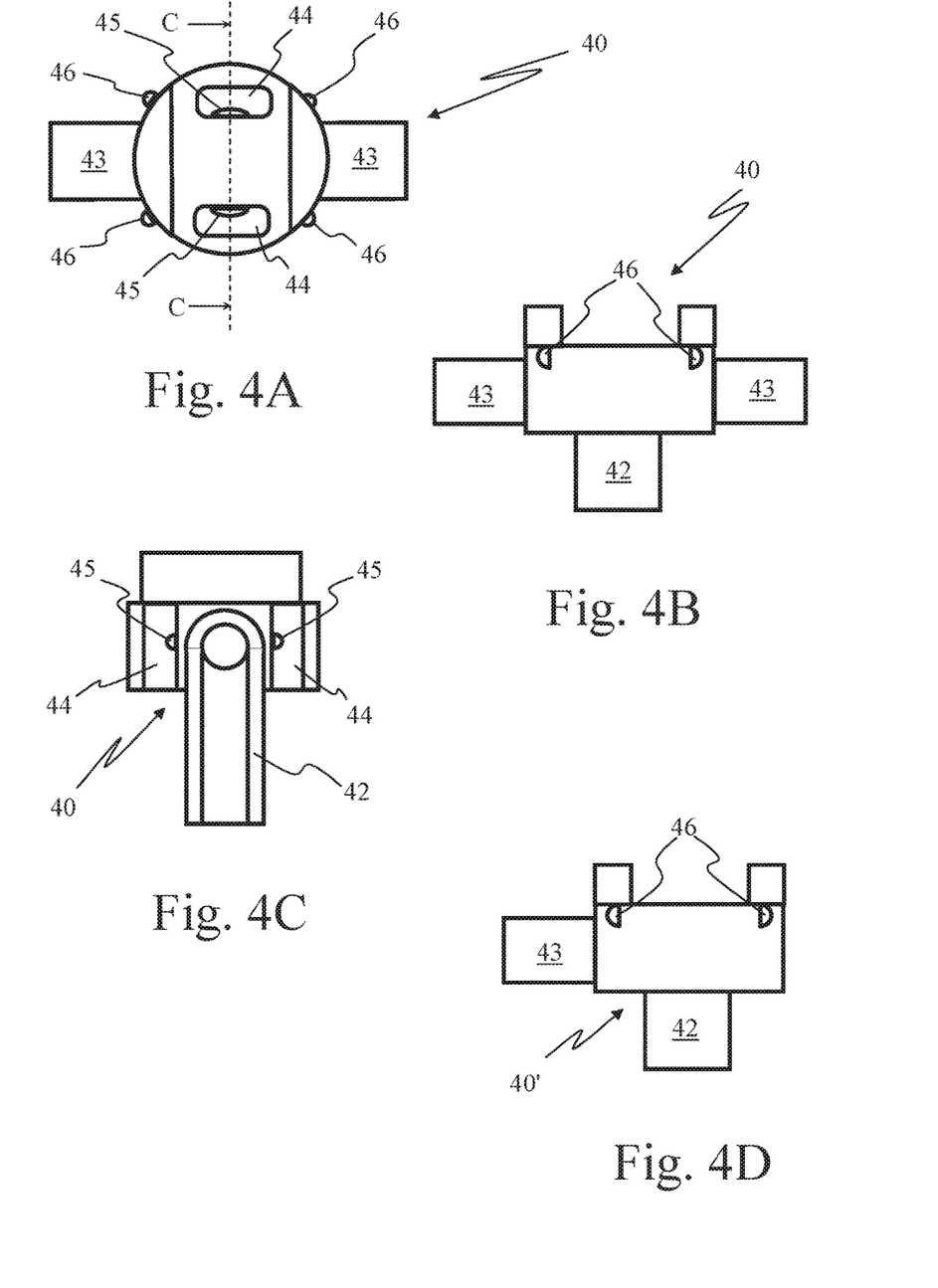
FIG. 4A is a top view which shows schematically some features of a T-shaped connector body.
FIG. 4B is a front view of the T-shaped connector body of FIG. 4A.
FIG. 4C is a section view alone plane C-C of the T-shaped connector body of FIG. 4A.
FIG. 4D is a front view which shows schematically a L-shaped connector body.

The connector body 40 shown in FIGS. 4A-4C is also provided with two line branches 43, perpendicularly arranged with respect to the connection branch 42 and in fluid communication with the same and between them for the connection of the T-shaped connector 10 to the fuel return line 17. It has to be noted that the two line branches 43 of the connector body 40 can be arranged coaxially (as for example shown in FIGS. 4A-4C), or angled one with respect to another (i.e. with their axes not coincident). The expression "T-shaped connector" used herein, can be applied to both configurations, i.e. coaxially and angled line branches 43, even if in the shown embodiment and in the following specific reference will be made to a configuration wherein the line branches 43 are coaxially arranged.

Two through passages 44 parallel to the connection branch 42 are provided in the connector body 40 and The coupling retainers 45 for the lower plate 50 are provided inside the through passages 44. The coupling retainers 46 for the upper plate 60 are also provided on the external surface of the connector body 40. According to a possible embodiment, The coupling retainers 45, 46 include a protruding portion intended to cooperate by an interference fit with another component of the connector. However, according to other possible embodiment, different configuration of the coupling retainers can be provided.

FIG. 4D shows schematically an embodiment of the connector body 40' for an L-shaped connector 10' shown in FIG. 1. The connector body 40' is similar to the connector body 40, i.e. it has the same through passages 44 and the same The coupling retainers 45 and 46 provide inside and outside the body; the only difference consists in a single line branch 43, perpendicularly arranged with respect to the connection branch 42 and in fluid communication with the same, for the connection of the L-shaped connector 10' to an end of the fuel return line 17.

Figure 5A:
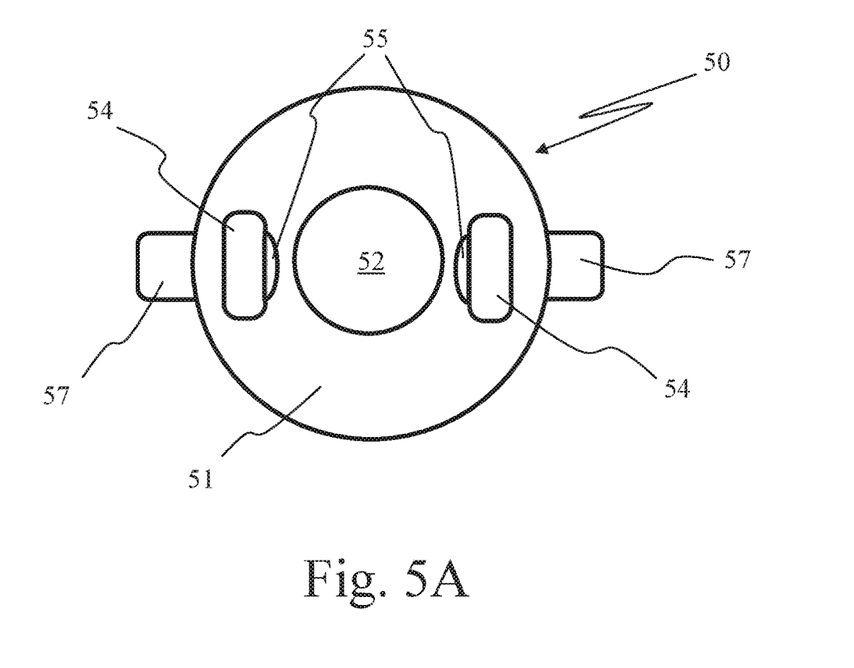
FIG. 5A is a top view which shows schematically some features of a lower plate.
Figure 5B:
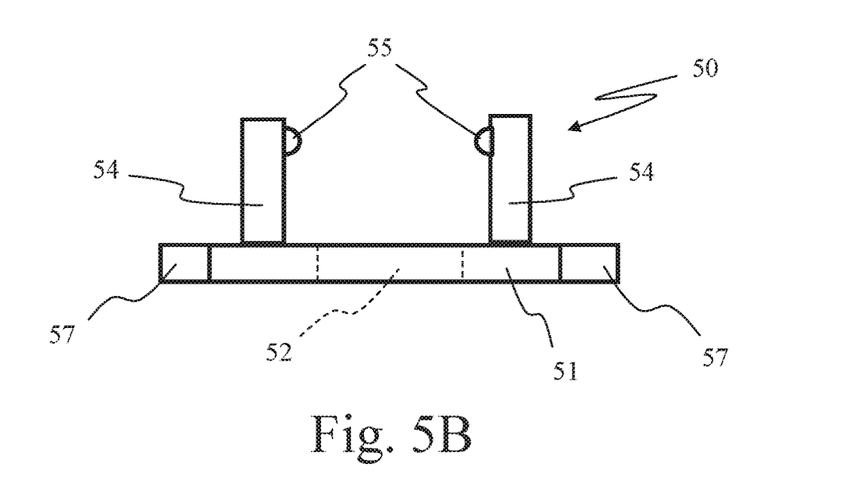
FIG. 5B is a front view of the lower plate of FIG. 5A.
Figure 6A:
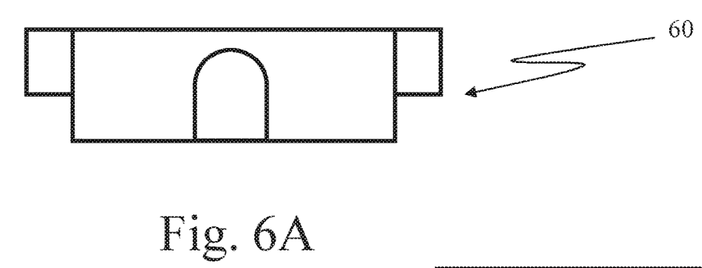
FIG. 6A is a front view which shows schematically some features of an upper plate.
Figure 6B:
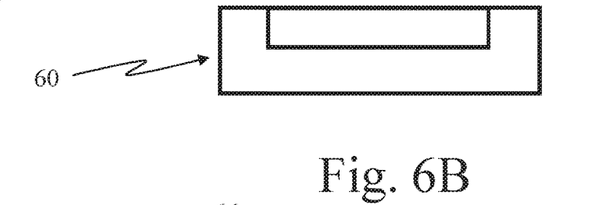
FIG. 6B is a side view of the upper plate of FIG. 6A.
Figure 6C:
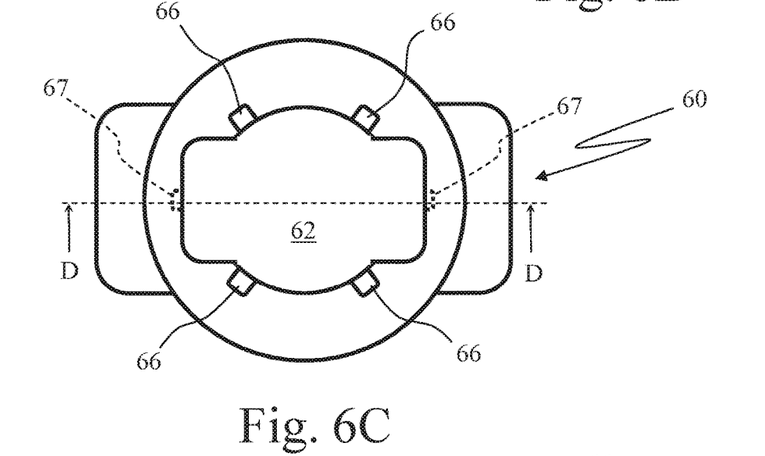
FIG. 6C is a top view of the upper plate of FIG. 6A.
Figure 6D:
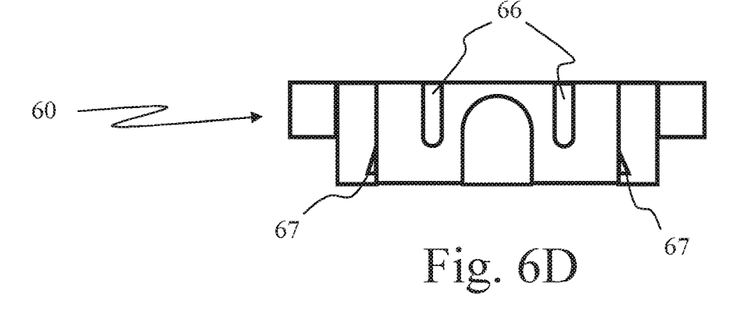
FIG. 6D is a section view along plane D-D of the upper plate of FIG. 6C.

As schematically shown in FIGS. 5A and 5B, an embodiment of the lower plate 50 has a flat portion 51, e.g. of substantially circular shape, with a central hole 52 in which the connection branch 42 of the connector body is slidingly engaged. On diametrically opposite sides of the hole 52 there are provided two arms 54 projecting perpendicularly from the flat portion 51 of the lower plate 50. The arms 54 are slidingly engaged on the through passages 44 of the connector body 40 (or 40') and are provided at their ends with The coupling retainers 55 that cooperate with the coupling retainers 45 provided inside the through passages 44 of the connector body 40 (or 40'). According to a possible embodiment, The coupling retainers 55 include a protruding portion intended to cooperate by an interference fit with The coupling retainers 45 provided inside the through passages 44 of the connector body 40 (or 40'). Two flanges 57 project outside in diametrically opposed positions from the perimeter of the flat portion 51 of the lower plate 50.

FIGS. 6A-6D schematically show an embodiment of an upper plate 60, which includes a central hole 62 engaged on the connector body 40 (or 40') and on the spring clip 70. The coupling retainers 66 are provided inside the central hole 62 to cooperate with the coupling retainers 46 provided on the external surface of the connector body 40 (or 40'). The coupling retainers 67 are also provided inside the central hole 62 to cooperate with the corresponding coupling retainers 76 provided on the external surface of the spring clip 70.

Figure 7A:
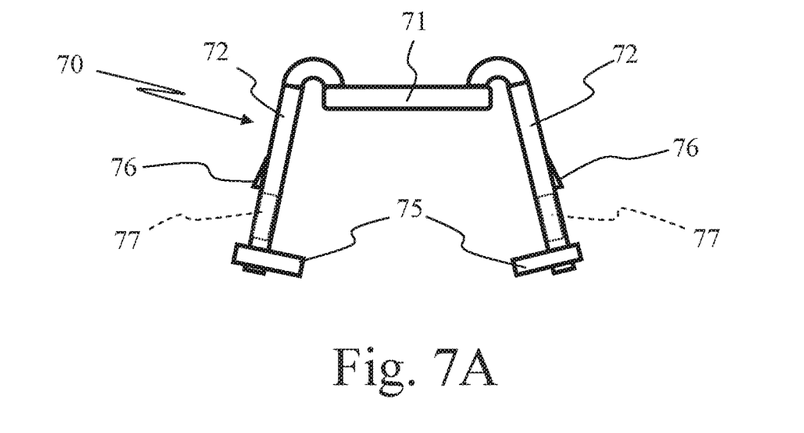
FIG. 7A is a front view which shows schematically some features of a spring clip in unloaded condition.
Figure 7B:
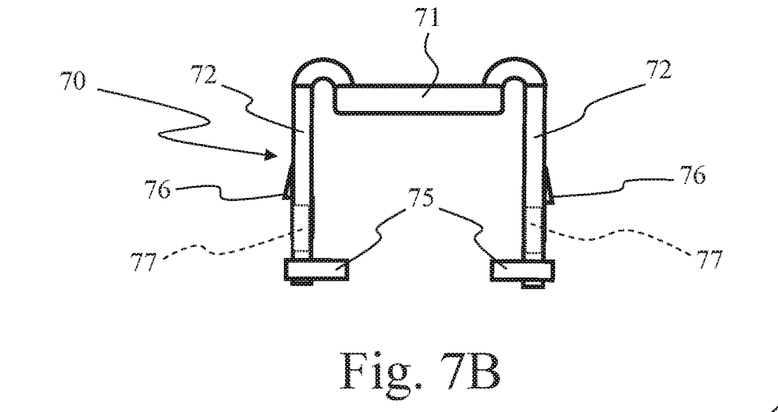
FIG. 7B is a front view which shows schematically the spring clip of FIG. 7A in loaded condition.

An embodiment of a spring clip 70 is schematically shown in FIGS. 7A-7D. The spring clip 70 has a web-shaped body including at least two wing portions 72 extending from a central portion 71 and inwardly protruding lips 75 at the end of the wing portions 72. FIG. 7A shows the spring clip 70 in unloaded condition, i.e. a condition in which the wing portions 72 are angled outwardly, whereas FIG. 7B shows the spring clip 70 in loaded condition, i.e. a condition in which the wing portions 72 are brought toward one another. The same loaded condition of the spring clip 70 is that shown in FIG. 3.

The coupling retainers 76, here represented as wedge-shaped projections, are provided on the external surface of the wing portions 72 of the spring clip 70 to cooperate with The coupling retainers 67 (e.g. including a seat intended to cooperate with the wedge-shaped projections) provided inside the central hole 62 of the upper plate 60. Even if reference has been made to wedge-shaped projections intended to cooperate with a correspondent seat, different configurations of the coupling retainers 76 and 67 can be provided. The wing portions 72 of the spring clip 70 also include openings 77 where the flanges 57 of the lower plate 50 are received in engagement when the spring clip 70 is in loaded condition.

Figure 7C:
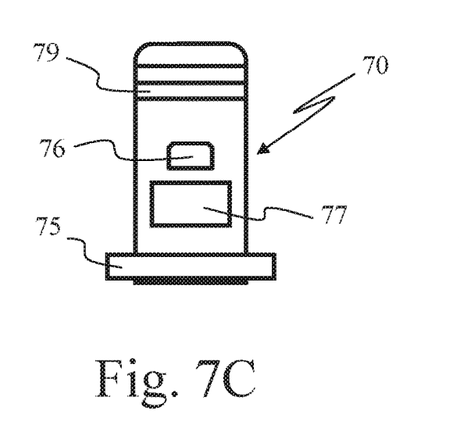
FIG. 7C is a side view of the spring clip of FIG. 7B.
Figure 7D:
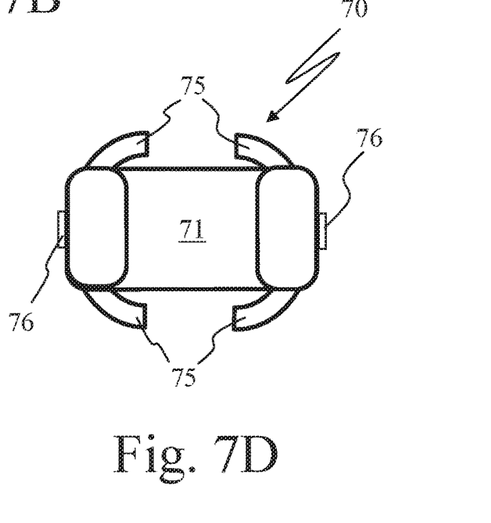
FIG. 7D is a top view of the spring clip of FIG. 7B.

As shown in FIG. 7C, the spring clip 70 also includes at least one error proofing mark 79, e.g. a colored mark, on the external surface of the wing portions of the spring clip 70. As better explained below, the error proofing mark 79 is concealed by the upper plate 60 when it is in its unlocked position, and becomes visible when the upper plate 60 is in its locked position.

Figure 8A:
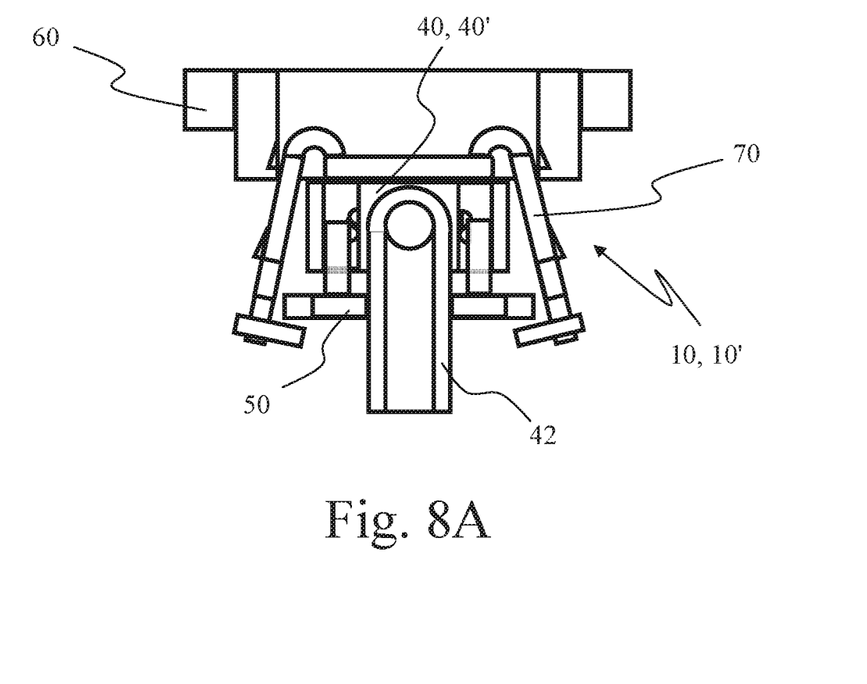
FIGS. 8A and 8B show schematically an embodiment of a quick fit connector before and after the installation, respectively.
Figure 8B:
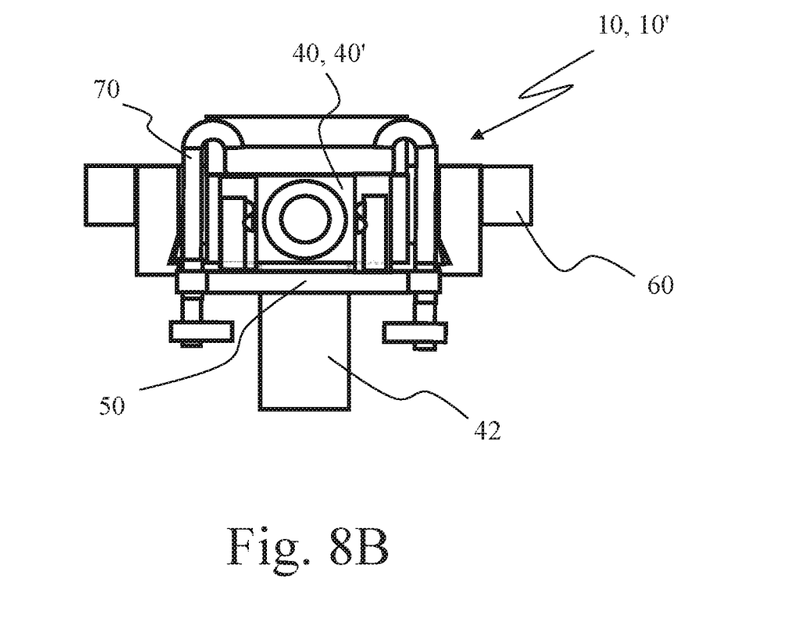

For a better understanding of the mutual combination of the components so far described, FIG. 8A shows the connector 10 (or 10') before the installation on an injector. The lower plate 50 is coupled to the connector body 40 by their arms inserted in the through passages 44 of the connector body. The flanges 57 of the lower plate 50 abut against the wing portions 72 of the spring clip 70 in unloaded condition, in order to maintain the wing portions 72 in an outwardly angled position. The spring clip 70 is in unloaded condition, i.e. free from any engagement with the injector. The upper plate 60 is slidingly mounted on the spring clip 70 and the connector body 40. In this condition the upper plate is in its unlocked position and is constrained from the extraction by the cooperation of The coupling retainers 46 on the connector body 40 and The coupling retainers 66 provided inside the upper plate. Starting from the condition shown in FIG. 8A, the upper plate 60 can be pushed down up to reach a locked position shown in FIG. 8B, i.e. the final position assumed after the installation of the connector 10 (or 10') in which the spring clip 70 is in loaded condition and engages the injector and the flanges 57 of the lower plate 50.

Figure 9A:
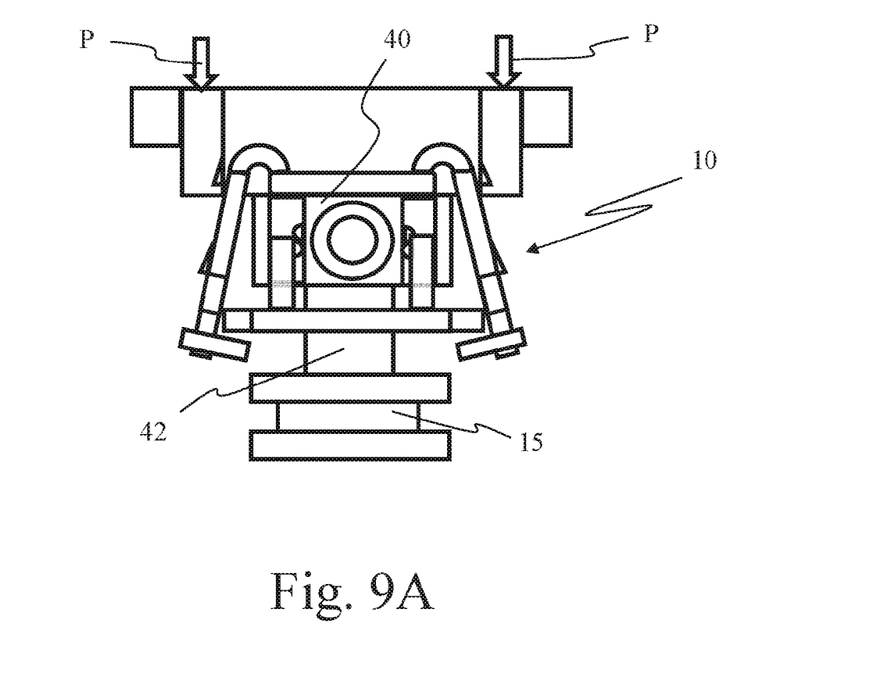
FIGS. 9A and 9B show schematically a starting phase of the installation of an embodiment of a quick fit connector to the fuel return port of an injector.
Figure 9B:
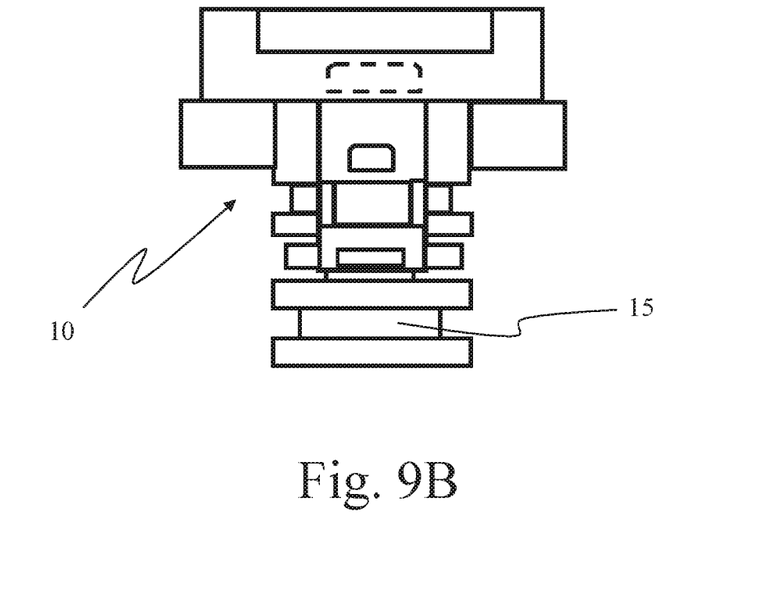
Figure 10A:
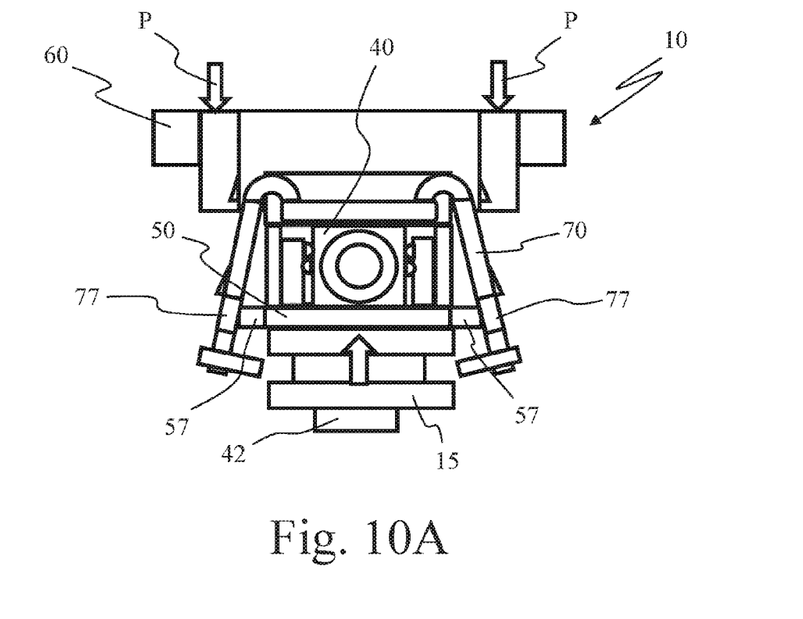
FIGS. 10A and 10B show schematically an intermediate phase of the installation of an embodiment of a quick fit connector to an injector.
Figure 10B:
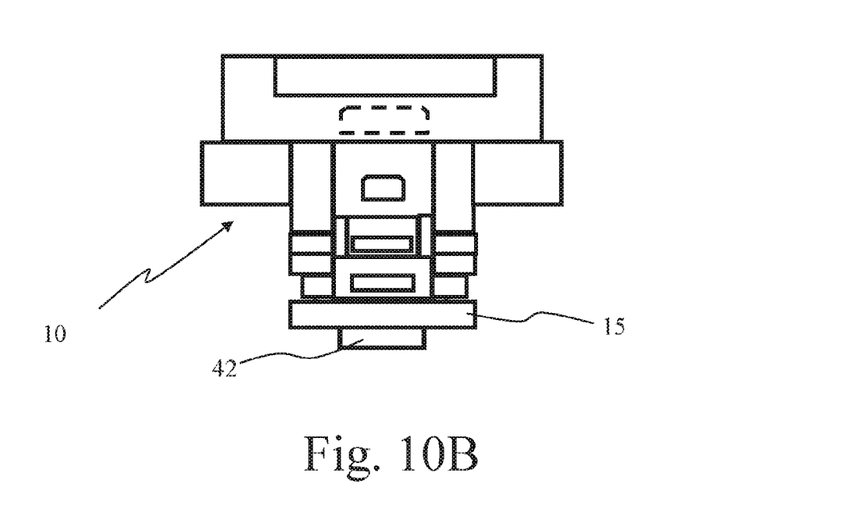

More particularly, as shown in FIGS. 9A and 9B, the first step of the installation phase of a connector 10 envisages the insertion of the connection branch 42 of the T-shaped connector body 40 in the fuel return port 15 of an injector. Then, as shown in FIGS. 10A and 10B, the upper plate 60 is pushed down (arrows P) and the lower plate 50, which abuts against the injector, causes the rising of the lower plate 50. The coupling retainers 55 provided on the arms 54 go beyond the corresponding The coupling retainers 45 provided inside the through passages 44 and, at the same time, the flanges 57 of the lower plate 50 are brought in correspondence of the openings 77 provided on the wing portions 72.

Figure 11A:
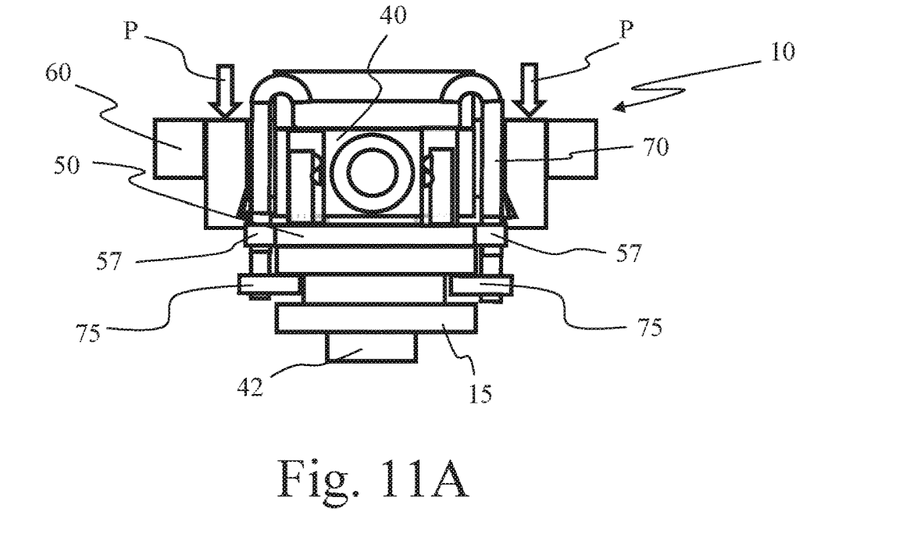
FIGS. 11A and 11B show schematically a final phase of the installation of an embodiment of a quick fit connector to an injector.
Figure 11B:
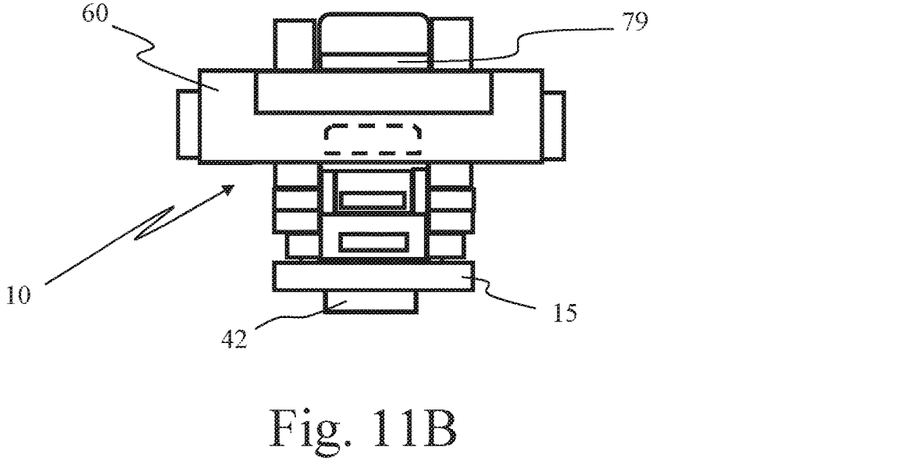

By further pushing down (arrows P) the upper plate 60, the installation is completed. As shown in FIGS. 11A and 11B, the upper plate 60 is now in its locked position, which is maintained by the cooperation coupling retainers 76 of the spring clip 70 and the corresponding The coupling retainers 67 provided inside the central hole 62 of the upper plate 60. The spring clip is in loaded condition and engages the injector, e.g. by the inwardly protruding lips 75 engaging an undercut at the injection port 15, and a further engagement is obtained between the flanges 57 of the lower plate 50 and the openings 77 of the wing portions 72 of the spring clip 70. As shown in FIG. 11B, when the upper plate 60 is in its locked position, the error proofing mark 79 becomes visible and guarantees the correct installation of the connector 10.

Figure 12A:
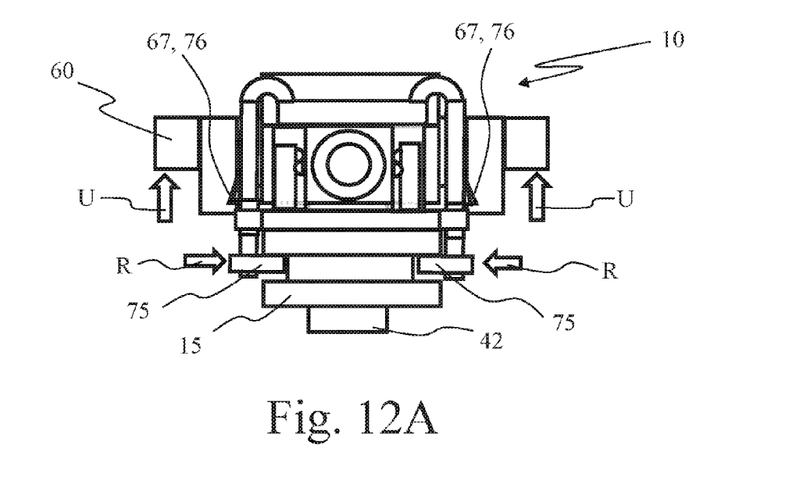
FIGS. 12A and 12B show schematically a starting phase of the removal of an embodiment of a quick fit connector from the fuel return port of an injector.
Figure 12B:
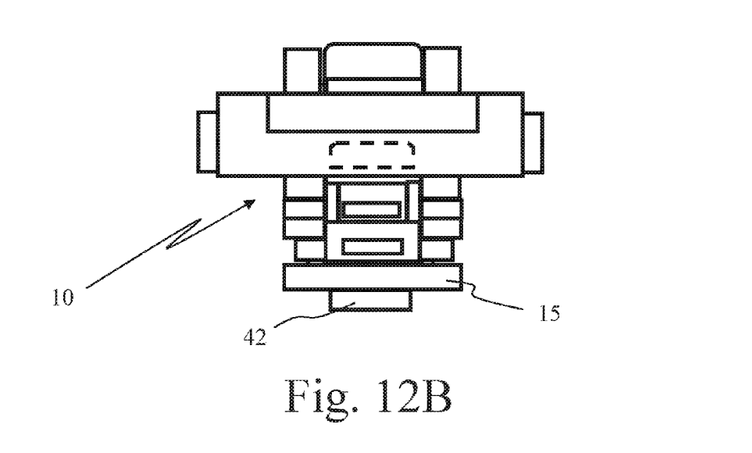
Figure 13A:
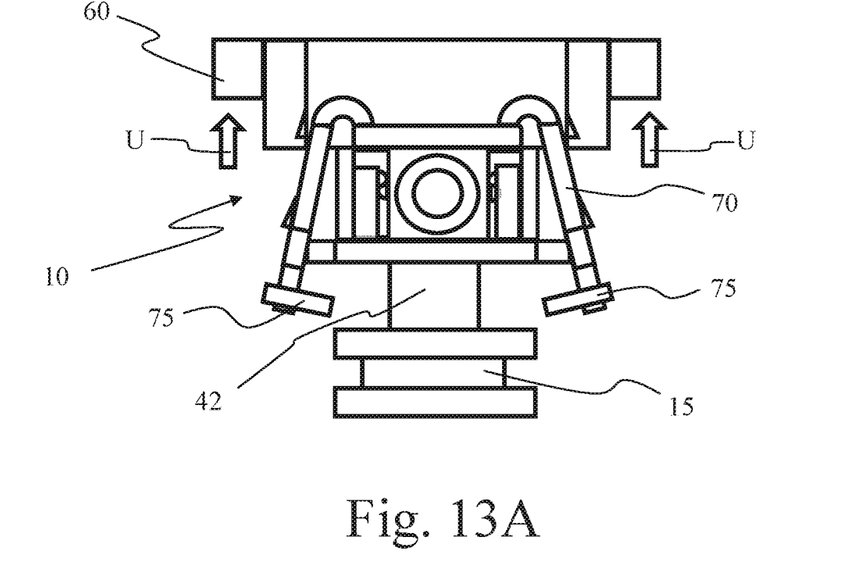
FIGS. 13A and 13B show schematically a final phase of the removal of an embodiment of a quick fit connector from the fuel return port of an injector.
Figure 13B:
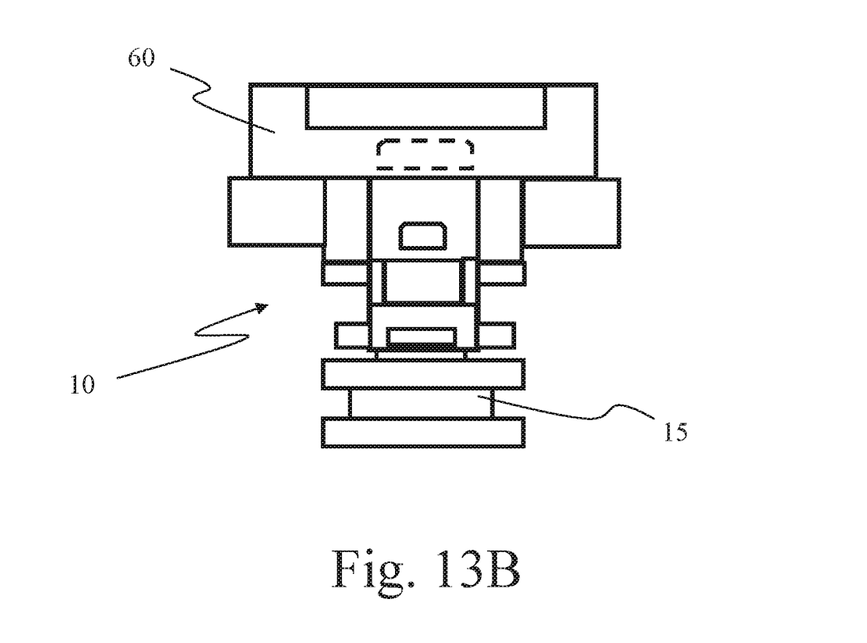

The connector 10 can also be removed in a simple way without the need of a tool or the like. As shown in FIGS. 12A and 12B, an inwardly radial pressure can be applied to the inwardly protruding lips 75 (arrows R) of the spring clip 70 while a pushing up action (arrows U) is exerted on the upper plate 60, in order to free the engagement between The coupling retainers 76 of the spring clip 70 and the coupling retainers 67 of the upper plate 60 which cooperate to retain the upper plate 60 in its locked position. Once the upper plate 60 can be freely moved upwardly (arrows U), the spring clip 70 returns in its unloaded condition, as shown in FIGS. 13A and 13B, the inwardly protruding lips 75 are spread apart from the injector and the connector 10 can be extracted from the injector port 15.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A quick fit connector for the return line of fuel injectors in an internal combustion engine, comprising:
   a connector body having at least one connection branch insertable in a fuel return port of a fuel injector;
   a lower plate;
   a spring clip; and an upper plate, the upper plate being slidingly mountable on the spring clip and the connector body, wherein the upper plate is movable between an unlocked position, in which the spring clip is in an unloaded condition and free from engaging the fuel injector and a locked position in which the spring clip is in a loaded condition for engaging the fuel injector and the lower plate.

2. The connector according to claim 1, wherein the connector body forms an L-shaped connector.

3. The connector according to claim 1, wherein the connector body forms a T-shaped connector.

4. The connector according to claim 1, wherein the connector body comprises at least two through passages parallel to the at least one connection branch, wherein a coupling retainer for the lower plate is provided inside the through passages.

5. The connector according to claim 4, wherein the lower plate comprises at least two arms projecting perpendicularly from the plate to slidingly engage the at least two through passages, wherein a second coupling retainer is provided at the end of the at least two arms to cooperate with the coupling retainer provided inside the at least two through passages of the connector body, and wherein the lower plate has a central hole in which the at least one connection branch is slidingly engaged.

6. The connector according to claim 1, wherein the lower plate comprises at least two flanges projecting outside from the perimeter of the lower plate.

7. The connector according to claim 1, wherein the spring clip comprises a web-shaped body including at least two wing portions extending from a central portion, and wherein inwardly protruding lips are provided at the end of the wing portions.

8. The connector according to claim 7, wherein the wing portions are angled outwardly when the spring clip is in the unloaded condition and brought toward one another when the spring clip is in the loaded condition, the inwardly protruding lips engaging the fuel injector when the spring clip is in the loaded condition.

9. The connector according to claim 7, wherein the flanges of the lower plate abut against the wing portions when the spring clip is in the unloaded condition, and wherein the wing portions of the spring clip include openings where the flanges of the lower plate are received in engagement when the spring clip is in the loaded condition.

10. The connector according to claim 7, wherein at least one error proofing mark is provided on the external surface of the wing portions of the spring clip, and wherein the at least one error proofing mark is concealed by the upper plate in its unlocked position and is visible when the upper plate is in its locked position.

11. The connector according to claim 7, wherein a coupling retainer is provided on the external surface of the wing portions of the spring clip for the upper plate.

12. The connector according to claim 1, wherein the upper plate comprises a central hole engaged on the connector body and on the spring clip, and wherein the coupling retainer is provided inside the central hole to cooperate with the coupling retainer provided on the external surface of the wing portions of the spring clip.

13. The connector according to claim 1, wherein a coupling retainer for the upper plate is provided on the external surface of the connector body.

14. The connector according to claim 13, wherein the upper plate comprises a central hole engaged on the connector body and on the spring clip, and wherein the coupling retainer is provided inside the central hole to cooperate with the coupling retainer provided on the external surface of the connector body.

15. A quick fit connector for the return line of fuel injectors in an internal combustion engine, comprising:
   a connector body having at least one connection branch insertable in a fuel return port of a fuel injector;
   a lower plate;
   a spring clip comprising a web-shaped body including at least two wing portions extending from a central portion, wherein inwardly protruding lips are provided at the end of the wing portions, and wherein at least one error proofing mark is provided on the external surface of the wing portions of the spring clip; and
   an upper plate, the upper plate being slidingly mountable on the spring clip and the connector body, wherein the upper plate is movable between an unlocked position, in which the spring clip is in an unloaded condition and free from engaging the fuel injector and a locked position in which the spring clip is in a loaded condition for engaging the fuel injector and the lower plate, and wherein the at least one error proofing mark is concealed by the upper plate in its unlocked position and is visible when the upper plate is in its locked position.

16. A method for mounting a quick fit connector to a fuel injector in an internal combustion engine, comprising:
   providing a quick fit connector having a connector body and at least one connection branch, a lower plate, an upper plate and a spring clip arranged between the upper plate and the lower plate, wherein the upper plate is slidingly mountable on the spring clip and the connector body;
   inserting the at least one connection branch of the connector body in a fuel return port of a fuel injector;
   sliding the upper plate from an unlocked position, in which the spring clip is in and unloaded condition and free from engaging the fuel injector to a locked position in which the spring clip is in a loaded condition and engages the fuel injector and the lower plate.

17. The method according to claim 16, wherein the spring clip comprises a web-shaped body including at least two wing portions extending from a central portion, and inwardly protruding lips provided at the end of the wing portions;
   wherein the wing portions are angled outwardly and flanges projecting outside from the perimeter of the lower plate abut against the wing portions when the upper plate is in the unlocked position and the spring clip is in the unloaded condition;
   wherein the wing portions of the spring clip include openings where the flanges of the lower plate are received in engagement when the upper plate is in the locked position and the spring clip is in the loaded condition; and
   wherein the inwardly protruding lips at the end of the wing portions engage the fuel injector when the upper plate is pushed down up to the locked position.

18. The method according to claim 17, wherein at least one error proofing mark is provided on an external surface of the wing portions of the spring clip, and wherein the at least one error proofing mark is concealed by the upper plate in its unlocked position and is visible when the upper plate reaches the locked position.

* * * * *